(12) United States Patent
Suzuki

(10) Patent No.: US 12,411,036 B2
(45) Date of Patent: Sep. 9, 2025

(54) PRESSURE GAUGE AND FLUID PRESSURE SYSTEM HAVING A FITTING STRUCTURE ARRANGEMENT

(71) Applicant: SMC CORPORATION, Tokyo (JP)

(72) Inventor: Takahiro Suzuki, Tsukubamirai (JP)

(73) Assignee: SMC CORPORATION, Tokyo (JP)

( * ) Notice: Subject to any disclaimer, the term of this patent is extended or adjusted under 35 U.S.C. 154(b) by 400 days.

(21) Appl. No.: 18/063,191

(22) Filed: Dec. 8, 2022

(65) Prior Publication Data

US 2023/0194324 A1   Jun. 22, 2023

(30) Foreign Application Priority Data

Dec. 17, 2021   (JP) .................. 2021-204698

(51) Int. Cl.
*G01F 15/18*   (2006.01)
*G01F 15/06*   (2022.01)

(52) U.S. Cl.
CPC .......... *G01F 15/185* (2013.01); *G01F 15/065* (2013.01)

(58) Field of Classification Search
None
See application file for complete search history.

(56) References Cited

U.S. PATENT DOCUMENTS

| 7,663,496 B2 * | 2/2010 | Kawakami ............ G01L 19/003 340/614 |
| 7,780,200 B2 * | 8/2010 | Mitsui ..................... F16B 21/16 285/124.1 |
| 2008/0291035 A1 | 11/2008 | Kawakami et al. |

FOREIGN PATENT DOCUMENTS

| EP | 1 930 710 A2 | 6/2008 |
| JP | 10-206262 A | 8/1998 |
| JP | 2009-074620 A | 4/2009 |
| JP | 2014-132268 A | 7/2014 |

OTHER PUBLICATIONS

Extended European Search Report issued May 12, 2023 in Patent Application No. 22212686.4 8 pages.
Office Action issued Jun. 17, 2025, in Japanese Patent Application No., 2021-204698 filed Dec. 17, 2021, citing documents 15 and 16 therain. 8 pages.

* cited by examiner

*Primary Examiner* — Peter J Macchiarolo
*Assistant Examiner* — Jermaine L Jenkins
(74) *Attorney, Agent, or Firm* — Oblon, McClelland, Maier &Neustadt, L.L.P.

(57) ABSTRACT

A pressure gauge of a fluid pressure system includes a measurement unit, a case, a display unit, and an adapter. The adapter includes an attachment hole. The case includes an attachment convex portion which can be fitted into the attachment hole. The display unit includes a display surface oriented in a direction intersecting an axis of the attachment convex portion. The attachment convex portion and the attachment hole have a fitting structure capable of changing the relative position between the attachment convex portion and the adapter in the circumferential direction about the axis of the attachment convex portion.

12 Claims, 13 Drawing Sheets

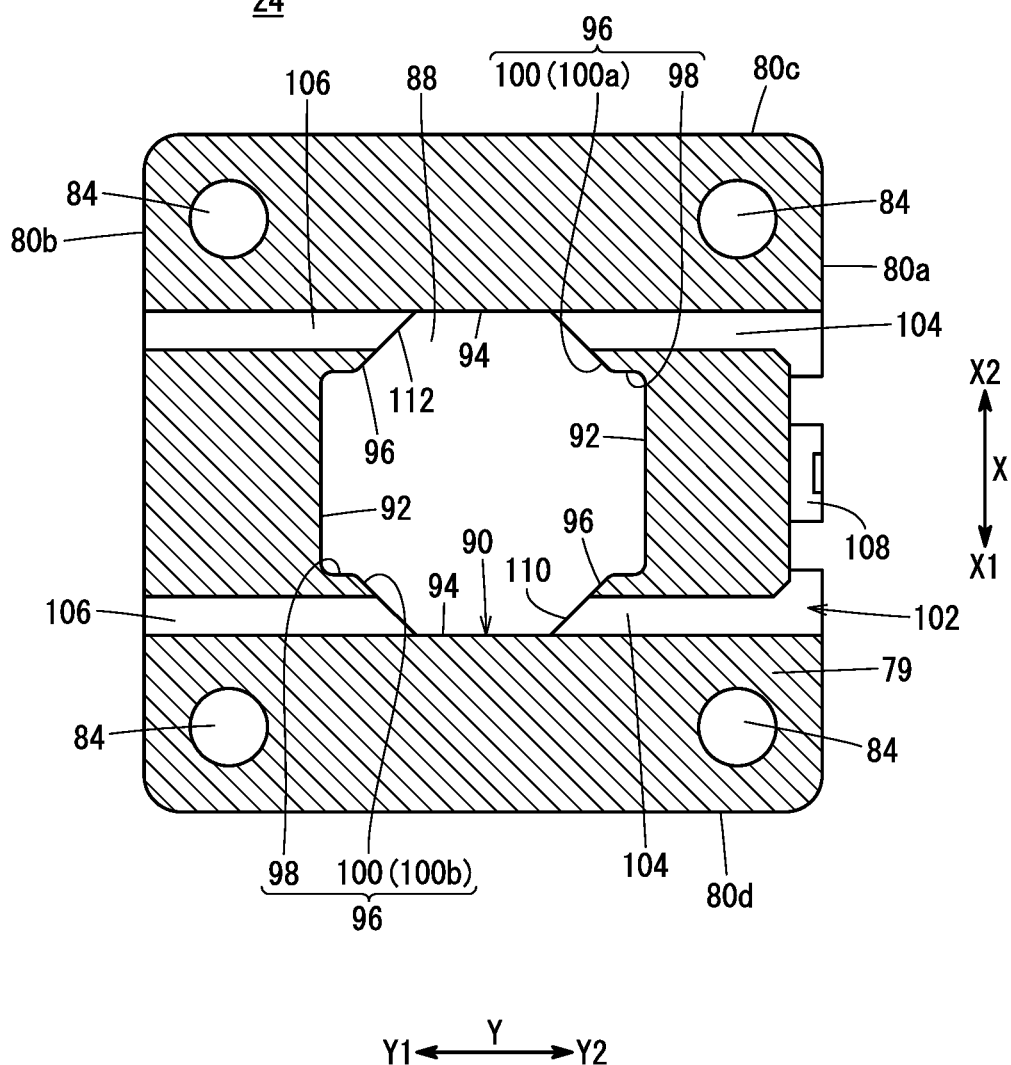

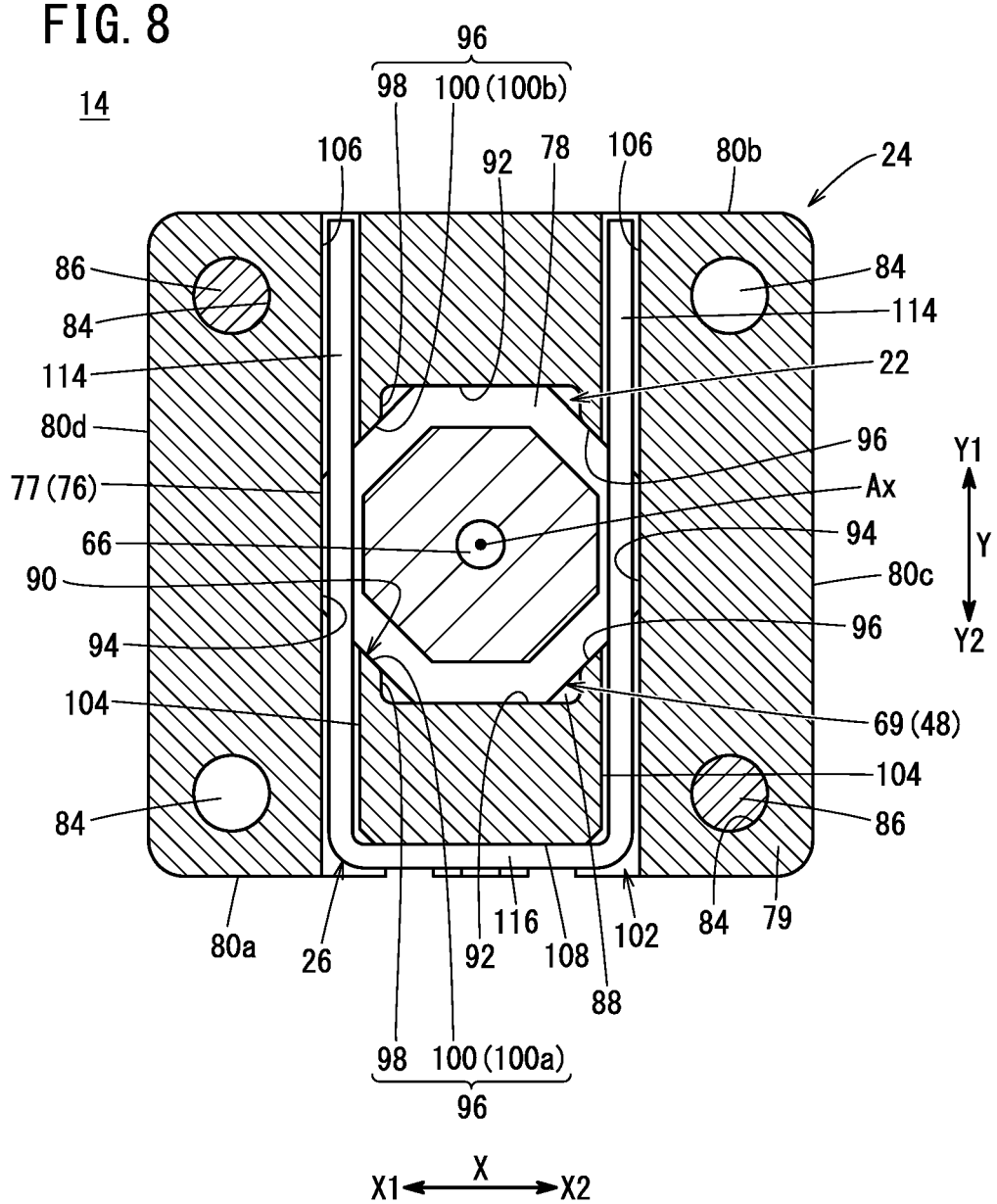

PRESSURE GAUGE AND FLUID PRESSURE SYSTEM HAVING A FITTING STRUCTURE ARRANGEMENT

CROSS-REFERENCE TO RELATED APPLICATIONS

This application is based upon and claims the benefit of priority from Japanese Patent Application No. 2021-204698 filed on Dec. 17, 2021, the contents of which are incorporated herein by reference.

BACKGROUND OF THE INVENTION

Field of the Invention

The present invention relates to a pressure gauge and a fluid pressure system.

Description of the Related Art

For example, JP H10-206262 A discloses a pressure gauge attached to a fluid pressure device. The pressure gauge includes a case that accommodates a measurement unit for measuring the pressure of a fluid, and a display unit provided on the case. The case is fixed to the fluid pressure device by a screw member. The display unit has a display surface oriented in the axial direction of the screw member.

SUMMARY OF THE INVENTION

In the above-described pressure gauge, the orientation of the display surface cannot be changed when the pressure gauge is attached to the fluid pressure device. Therefore, depending on the user's usage, the display surface of the pressure gauge may be oriented in a direction in which the display surface is difficult to view.

The present invention has the object of solving the aforementioned problem.

According to an aspect of the present invention, there is provided a pressure gauge comprising: a case configured to accommodate a measurement unit configured to measure a pressure of a fluid; a display unit provided in the case and configured to display the pressure measured by the measurement unit; and an adapter attached to a fluid pressure device, wherein the adapter includes an attachment hole, the case includes an attachment convex portion configured to be fitted into the attachment hole, the display unit includes a display surface oriented in a direction intersecting an axis of the attachment convex portion, and the attachment convex portion and the attachment hole have a fitting structure that allows a relative position between the attachment convex portion and the adapter in a circumferential direction about the axis of the attachment convex portion to be changed.

According to another aspect of the present invention, there is provided a fluid pressure system comprising a fluid pressure device, and a pressure gauge attached to the fluid pressure device, wherein the pressure gauge is the above-described pressure gauge.

According to the present invention, the display surface is oriented in the direction intersecting the axis of the attachment convex portion. Further, the attachment convex portion and the attachment hole have a fitting structure capable of changing the relative position between the attachment convex portion and the adapter in the circumferential direction about the axis of the attachment convex portion. Therefore, the orientation of the display surface can be easily changed.

As a result, it is possible to orient the display surface in a direction in which the display surface is easily visible, according to the user's usage.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 7 is a transverse cross-sectional view of an adapter of FIG. 2;

FIG. 8 is a transverse cross-sectional view taken along line VIII-VIII of FIG. 3;

DESCRIPTION OF THE INVENTION

Figure 1:
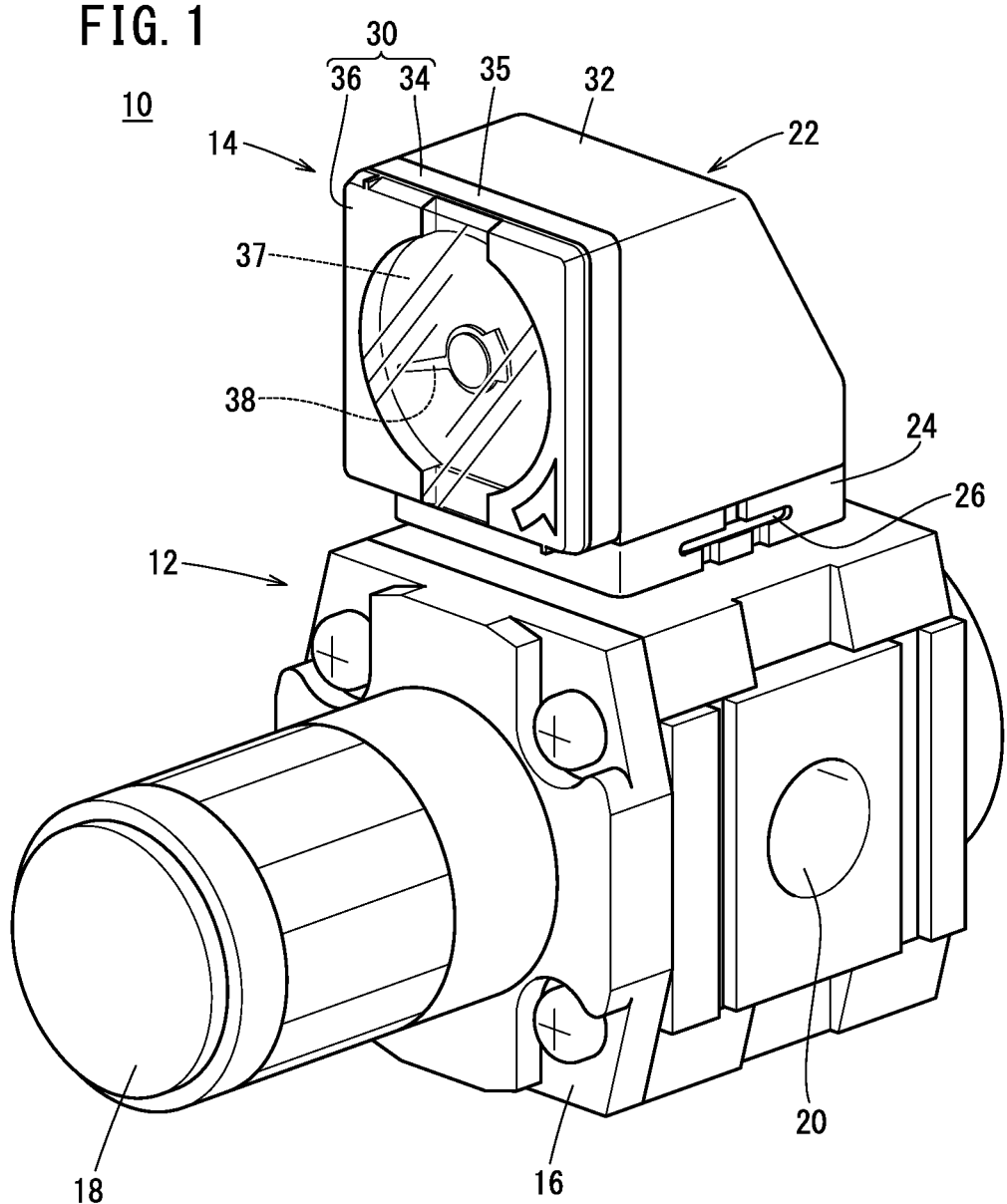
FIG. 1 is a perspective view of a fluid pressure system according to an embodiment of the present invention.

As shown in FIG. 1, a fluid pressure system 10 according to an embodiment of the present invention includes a fluid pressure device 12, and a pressure gauge 14 attached to the fluid pressure device 12. The fluid pressure device 12 is, for example, a regulator (pressure regulator) for regulating the pressure of a fluid. The regulator includes a valve main body 16 and a handle 18.

The valve main body 16 is formed in a rectangular parallelepiped shape. The handle 18 that is operated by being rotated is attached to the valve main body 16. The valve main body 16 includes a plurality of ports 20 through which the fluid flows. The plurality of ports 20 include input ports and output ports. The pressure gauge 14 is attached to an outer surface of the valve main body 16 that is oriented in a direction orthogonal to the axial direction of the handle 18. The handle 18 adjusts the set pressure of the fluid delivered from the fluid pressure device 12. The fluid pressure device 12 to which the pressure gauge 14 is attached is not limited to a regulator.

Figure 2:
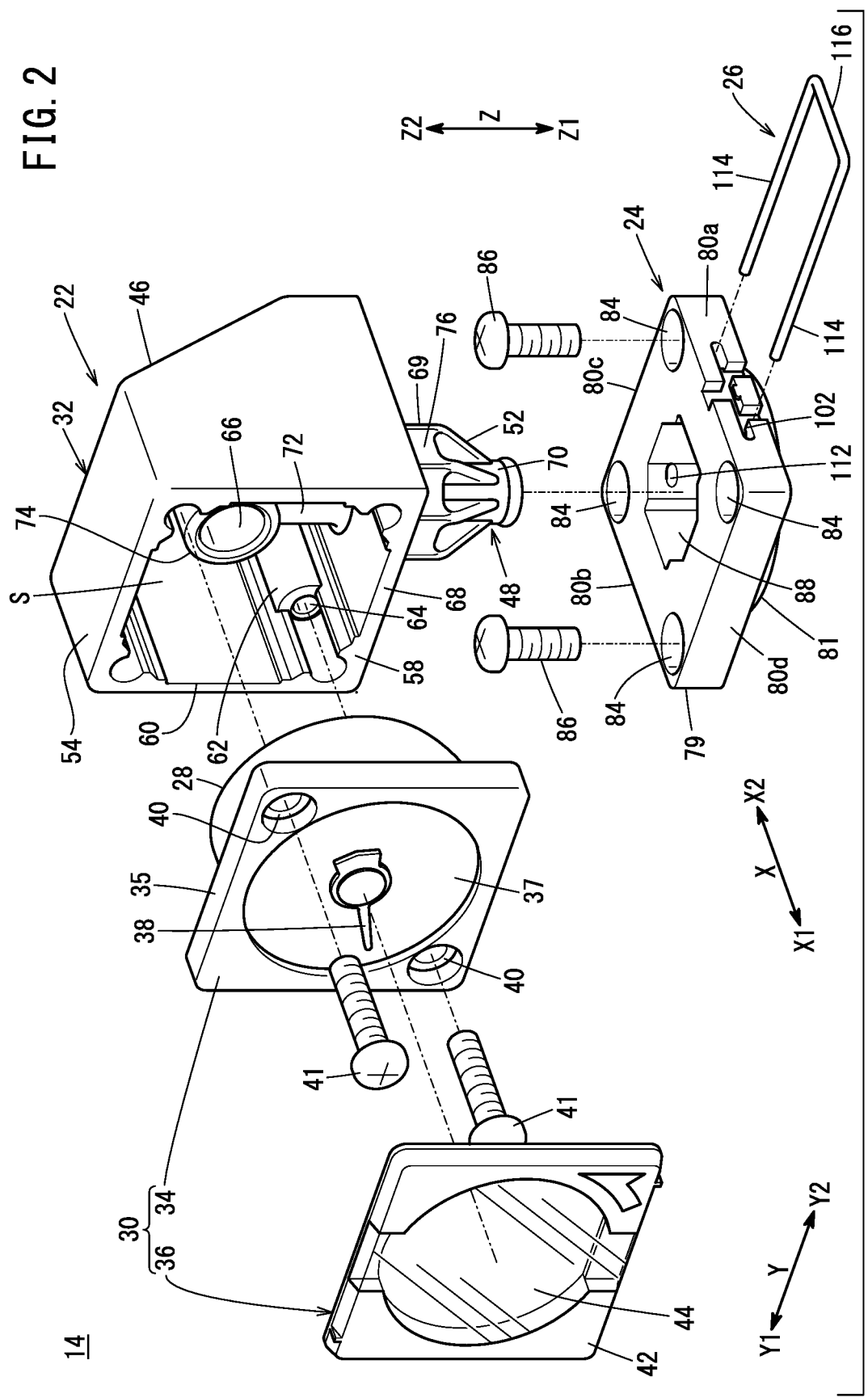
FIG. 2 is an exploded perspective view of a pressure gauge of FIG. 1.

As shown in FIG. 2, the pressure gauge 14 includes a pressure gauge main body 22, an adapter 24, and a retaining member 26. The pressure gauge main body 22 includes a measurement unit 28, a display unit 30, and a case 32. The measurement unit 28 measures the pressure of the fluid. The display unit 30 displays the pressure measured by the measurement unit 28.

Figure 3:
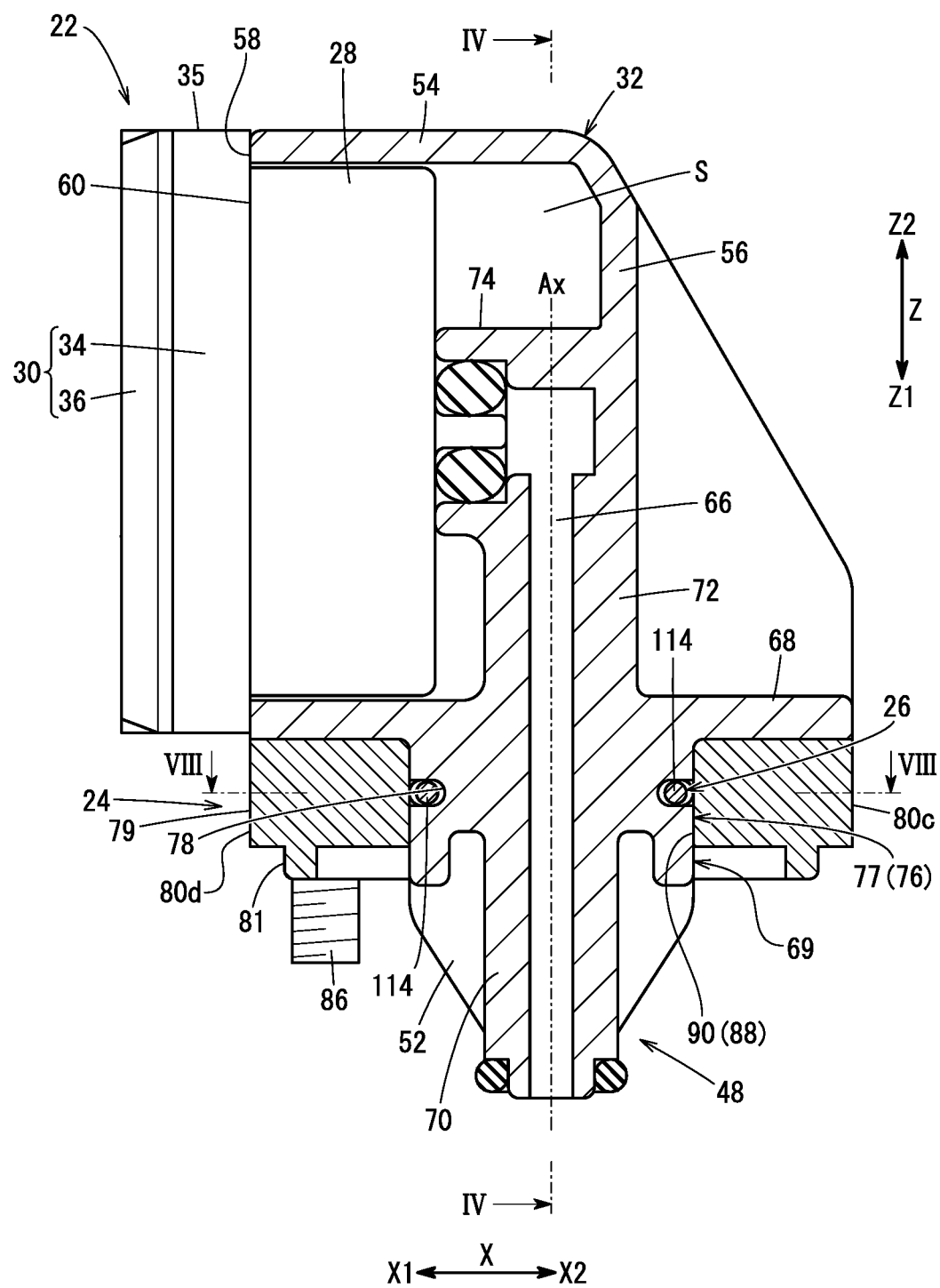
FIG. 3 is a longitudinal cross-sectional view of the pressure gauge of FIG. 2.

In FIGS. 2 and 3, the display unit 30 includes a display main body 34 and a cover 36. The display main body 34 is a square plate-shaped portion. A display surface 37 is provided on one surface of the display main body 34. The display surface 37 is provided with a scale (not shown). A pointer 38 is rotatably attached to a central portion of the display surface 37. The measurement unit 28 is attached to another surface of the display main body 34.

As shown in FIG. 2, the display main body 34 includes two insertion holes 40. The two insertion holes 40 are respectively located at diagonal corners of the display main body 34. A bolt 41 for attaching the display main body 34 to the case 32 is inserted through each insertion hole 40.

The cover 36 is attached to one surface of the display main body 34. The cover 36 includes a frame portion 42 that covers an outer peripheral portion of the display surface 37 of the display main body 34, and a transparent portion 44 that covers the display surface 37.

Figure 4:
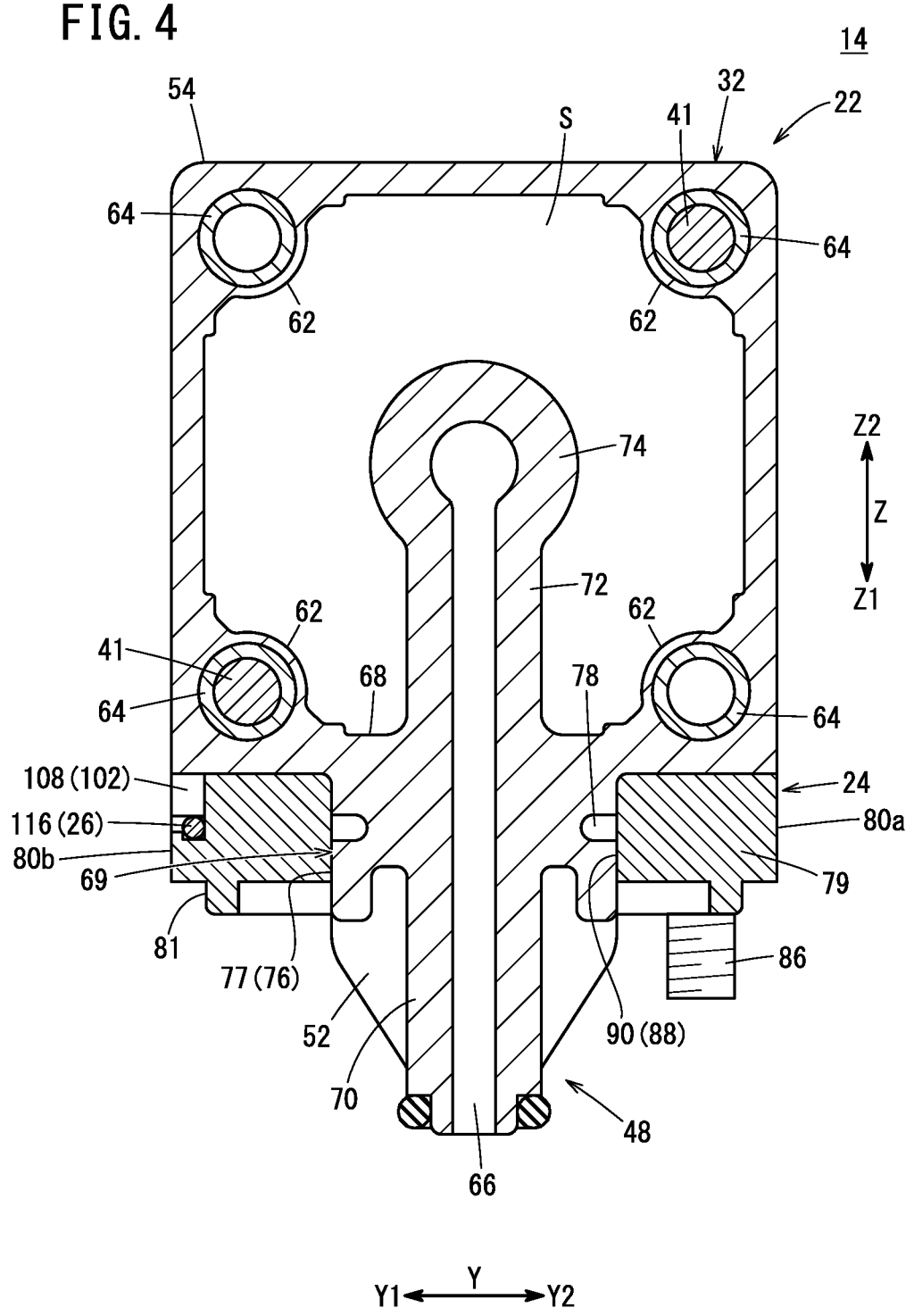
FIG. 4 is a longitudinal cross-sectional view taken along line IV-IV of FIG. 3.

As shown in FIGS. 2 to 4, the case 32 is an integrally molded product made of a resin material. The case 32 includes a hollow case main body 46, a fluid introduction portion 48, and a plurality of reinforcing ribs 52. The case main body 46 includes a peripheral wall portion 54 having a square tubular shape, and an end wall portion 56 (see FIG. 3). The peripheral wall portion 54 extends in one direction.

In the following description, the extending direction of the peripheral wall portion 54 may be referred to as an arrow X direction, a width direction of the peripheral wall portion 54 may be referred to as an arrow Y direction, and a height direction of the peripheral wall portion 54 may be referred to as an arrow Z direction. The arrow Z direction lies along the thickness direction of the plate-shaped adapter 24.

The outer surface of the peripheral wall portion 54 has a substantially square transverse cross-sectional shape (see FIG. 4). In FIGS. 2 and 3, one end portion (an end portion on an arrow X1 direction side) of the peripheral wall portion 54 includes an attachment surface 58 to which the display unit 30 is attached. The attachment surface 58 is a flat surface oriented in the arrow X1 direction. The outer shape of the attachment surface 58 is square. In other words, the outer shape of the attachment surface 58 is the same as the outer shape of the display main body 34. Further, the outer size of the attachment surface 58 is the same as the outer size of the display main body 34. A hole 60 for inserting the measurement unit 28 into an internal space S of the peripheral wall portion 54 is formed in the attachment surface 58.

In FIG. 4, each of the four corners of the inner surface of the peripheral wall portion 54 includes a bulging portion 62 bulging inward of the peripheral wall portion 54. A nut 64, into which the bolt 41 for fixing the display unit 30 to the case main body 46 is screwed, is insert-molded in each of the bulging portions 62.

As shown in FIG. 2, the display unit 30 is attached to the case 32 by screwing the two bolts 41, inserted through the two insertion holes 40 of the display main body 34, into the two nuts 64. The display unit 30 can be attached to the case 32 such that the relative position between the display unit 30 and the peripheral wall portion 54 in the circumferential direction about the rotation axis of the pointer 38 can be changed. In other words, the display unit 30 can be attached to the case 32 such that the orientation of an upper end surface 35 of the display main body 34 can be changed.

Specifically, the display unit 30 can be attached to the case 32 such that the upper end surface 35 of the display main body 34 is oriented in an arrow Z2 direction. Further, the display unit 30 can be attached to the case 32 such that the upper end surface 35 of the display main body 34 is oriented in an arrow Y1 direction. Furthermore, the display unit 30 can be attached to the case 32 such that the upper end surface 35 of the display main body 34 is oriented in an arrow Z1 direction. Moreover, the display unit 30 can be attached to the case 32 such that the upper end surface 35 of the display main body 34 is oriented in an arrow Y2 direction. Accordingly, when the display unit 30 is attached to the case 32, the orientation of the upper end surface 35 of the display main body 34 can be changed according to the user's usage.

In FIG. 3, the end wall portion 56 is located at another end portion (an end portion on an arrow X2 side) of the peripheral wall portion 54. The end wall portion 56 covers the internal space S of the peripheral wall portion 54 from the arrow X2 direction.

As shown in FIGS. 3 and 4, an introduction flow path 66 for guiding the fluid of the fluid pressure device 12 to the measurement unit 28 is formed in the fluid introduction portion 48. The fluid introduction portion 48 includes an attachment convex portion 69, a first introduction pipe portion 70, a second introduction pipe portion 72, and a connection pipe portion 74. The attachment convex portion 69 protrudes outward of the peripheral wall portion 54 (in the arrow Z1 direction) from a support wall portion 68 of the peripheral wall portion 54, the support wall portion 68 being located in a direction (on the arrow Z1 direction side) orthogonal to the rotation axis of the pointer 38.

The first introduction pipe portion 70 extends in the arrow Z1 direction from a protruding end surface of the attachment convex portion 69. An extended end portion of the first introduction pipe portion 70 is inserted into the valve main body 16 in a state where the pressure gauge 14 is attached to the fluid pressure device 12.

The second introduction pipe portion 72 extends from the support wall portion 68 in a direction (the arrow Z2 direction) opposite to the extending direction of the first introduction pipe portion 70. The second introduction pipe portion 72 extends to the internal space S of the peripheral wall portion 54. The inner hole of the second introduction pipe portion 72 communicates with the inner hole of the first introduction pipe portion 70. The second introduction pipe portion 72 is connected to the inner surface of the end wall portion 56 (see FIG. 3).

The connection pipe portion 74 protrudes in the arrow X1 direction from the inner surface of the end wall portion 56 toward the measurement unit 28. An extended end portion of the second introduction pipe portion 72 is connected to the connection pipe portion 74. The inner hole of the connection pipe portion 74 communicates with the inner hole of the second introduction pipe portion 72. The measurement unit 28 is airtightly connected to a protruding end of the connection pipe portion 74.

As shown in FIG. 3, the display surface 37 of the display unit 30 is oriented in a direction intersecting an axis Ax of the attachment convex portion 69. In other words, the display surface 37 of the display unit 30 is oriented in a direction orthogonal to the axis Ax of the attachment convex portion 69. The attachment convex portion 69 is provided with the introduction flow path 66 (see FIGS. 3 and 4).

Figure 5:
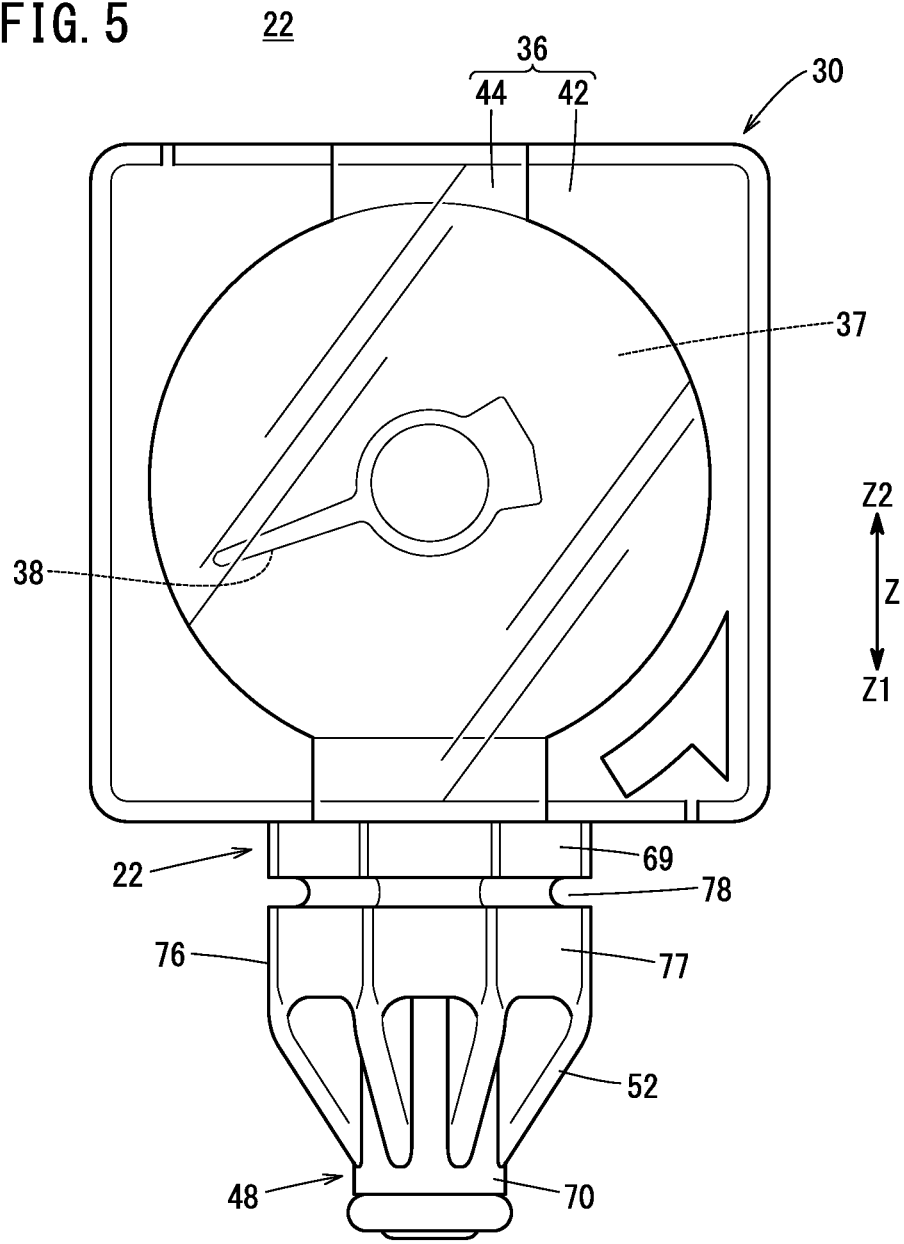
FIG. 5 is a front view of a pressure gauge main body of FIG. 2.
Figure 6:
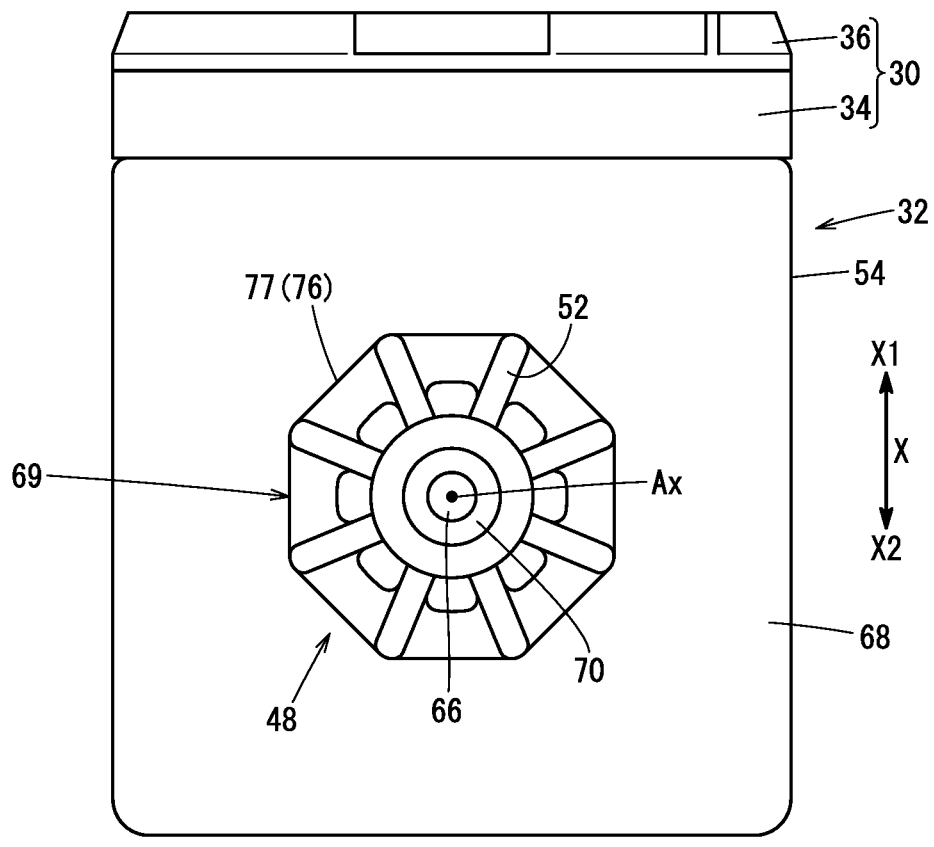
FIG. 6 is a bottom view of the pressure gauge main body of FIG. 2.

As shown in FIG. 6, the attachment convex portion 69 has a polygonal outer attachment surface 76. In other words, the attachment convex portion 69 has the outer attachment surface 76 having an octagonal shape. Specifically, the outer attachment surface 76 is formed in a regular octagonal shape when viewed from the arrow Z1 direction. That is, the outer attachment surface 76 has eight flat surfaces 77. The attachment convex portion 69 is 45° rotationally symmetric about the axis Ax of the attachment convex portion 69. An annular groove 78 extending in the circumferential direction about the axis Ax of the attachment convex portion 69 is formed in an intermediate portion of the outer attachment surface 76 in the arrow Z direction (see FIGS. 3 to 5).

The plurality of reinforcing ribs 52 extend from the protruding end surface of the attachment convex portion 69 toward the extended end portion of the first introduction pipe portion 70. In the present embodiment, the case 32 includes eight reinforcing ribs 52. The reinforcing ribs 52 are respectively connected to a plurality of corner portions of the outer attachment surface 76. The plurality of reinforcing ribs 52 are arranged at equal intervals in the circumferential direction about the axis Ax of the attachment convex portion 69. The shape, size, number, and the like of the reinforcing ribs 52 can be set as appropriate.

As shown in FIG. 2, the adapter 24 includes a quadrangular plate-shaped adapter main body 79, and a protruding portion 81. Specifically, the adapter main body 79 is formed in a square shape. The adapter main body 79 has a first side surface 80a, a second side surface 80b, a third side surface 80c, and a fourth side surface 80d. The first side surface 80a and the second side surface 80b extend in the same direction. The third side surface 80c and the fourth side surface 80d extend in a direction orthogonal to the extending direction of the first side surface 80a and the second side surface 80b.

The adapter main body 79 includes four insertion holes 84. The four insertion holes 84 are located at four corners of the adapter main body 79, respectively. The adapter main body 79 is 90° rotationally symmetric about the center line of the adapter main body 79 when viewed from the thickness direction. Bolts 86 for attaching the adapter 24 to the fluid pressure device 12 are inserted through two insertion holes 84 that are diagonally positioned among the four insertion holes 84.

The protruding portion 81 protrudes in the thickness direction from one surface of the adapter main body 79. The protruding portion 81 extends in an annular shape.

In FIGS. 7 and 8, an attachment hole 88 into which the attachment convex portion 69 can be fitted is formed in a central portion of the adapter main body 79. The adapter main body 79 includes an inner attachment surface 90 surrounding the attachment hole 88. The inner attachment surface 90 is formed in a polygonal shape. The inner attachment surface 90 is close to or in contact with the outer attachment surface 76 such that rotation of the attachment convex portion 69 about the axis Ax is restricted in a state in which the attachment convex portion 69 is fitted into the attachment hole 88 (see FIG. 8). The inner attachment surface 90 includes two first flat surfaces 92, two second flat surfaces 94, and four connecting surfaces 96.

Each first flat surface 92 extends along the extending direction of the first side surface 80a and the second side surface 80b of the adapter 24. The two first flat surfaces 92 are positioned to face each other. The length of each first flat surface 92 in the extending direction thereof is longer than the width of each flat surface 77 of the outer attachment surface 76. The two first flat surfaces 92 have the same length in the extending direction thereof.

Each second flat surface 94 extends along the extending direction of the third side surface 80c and the fourth side surface 80d of the adapter 24. In other words, each second flat surface 94 extends in a direction orthogonal to the extending direction of each first flat surface 92. The two second flat surfaces 94 are positioned to face each other. The length of each second flat surface 94 along the extending direction thereof is shorter than the length of each first flat surface 92 along the extending direction thereof. The two second flat surfaces 94 have the same length in the extending direction thereof.

The four connecting surfaces 96 each connect an end portion of the first flat surface 92 and an end portion of the second flat surface 94 to each other. Each connecting surface 96 includes a first connecting flat surface 98 and a second connecting flat surface 100. The first connecting flat surface 98 extends from the end portion of the first flat surface 92 toward the attachment hole 88. The first connecting flat surface 98 extends along the extending direction of the second flat surface 94.

The second connecting flat surface 100 extends from an extended end portion of the first connecting flat surface 98 to the end portion of the second flat surface 94. The second connecting flat surface 100 extends in a direction intersecting the extending direction of the first flat surface 92 and the extending direction of the second flat surface 94. The length of the second connecting flat surface 100 along the extending direction thereof is shorter than the length of the second flat surface 94 along the extending direction thereof. The length of the second connecting flat surface 100 along the extending direction thereof is shorter than the width of each flat surface 77 of the outer attachment surface 76 (see FIG. 8).

In FIG. 8, in a fitted state in which the attachment convex portion 69 is fitted into the attachment hole 88, the eight flat surfaces 77 of the attachment convex portion 69 face the two first flat surfaces 92, the two second flat surfaces 94, and the four second connecting flat surfaces 100. In other words, in the fitted state, the four first connecting flat surfaces 98 are spaced apart from the outer attachment surface 76.

In the following description, among the four second connecting flat surfaces 100, two second connecting flat surfaces 100 extending from the second flat surface 94 toward the first side surface 80a may be referred to as "second connecting flat surfaces 100a". Further, among the four second connecting flat surfaces 100, two second connecting flat surfaces 100 extending from the second flat surface 94 toward the second side surface 80b may be referred to as "second connecting flat surfaces 100b".

An insertion hole 102 into which the retaining member 26 is inserted is formed in the adapter 24. The insertion hole 102 includes two first holes 104, two second holes 106, and a communication hole 108. The two first holes 104 extend linearly from the first side surface 80a to the two second connecting flat surfaces 100a along the extending direction of the third side surface 80c and the fourth side surface 80d. The two first holes 104 extend in parallel to each other. Each first hole 104 opens to the first side surface 80a. Each first hole 104 includes a first opening portion 110 that opens to the second connecting flat surface 100a.

The two second holes 106 extend linearly from the second side surface 80b to the two second connecting flat surfaces 100b along the extending direction of the third side surface 80c and the fourth side surface 80d. The two second holes 106 extend in parallel to each other. The transverse cross-sectional shape of each second hole 106 is the same as the transverse cross-sectional shape of each first hole 104. Each second hole 106 opens to the second side surface 80b. Each second hole 106 includes a second opening portion 112 that opens to the second connecting flat surface 100b. Each second connecting flat surface 100b is inclined with respect to the extending direction of the second hole 106. Therefore, the area of the second opening portion 112 is larger than the cross-sectional area of the intermediate portion of the second hole 106.

One of the second holes 106 extends on an extension line of one of the first holes 104. The other of the second holes 106 extends on an extension line of the other of the first holes 104. The first opening portion 110 faces the second opening portion 112. The communication hole 108 connects end portions of the two first holes 104 to each other. The communication hole 108 opens to the first side surface 80a.

In FIGS. 2 and 8, the retaining member 26 extends in a line shape. Specifically, the retaining member 26 is a clip formed in a U shape. The retaining member 26 is formed by bending a metal rod into a U shape. The retaining member 26 is inserted into the insertion hole 102, thereby preventing the attachment convex portion 69 from coming out of the attachment hole 88.

The retaining member 26 includes two locking portions 114 and a connecting portion 116. The two locking portions 114 extend in parallel to each other. The connecting portion 116 connects end portions of the two locking portions 114 to each other. Each locking portion 114 is positioned so as to straddle the first hole 104, the annular groove 78, and the second hole 106. The connecting portion 116 is located in the communication hole 108.

Next, a procedure for attaching the pressure gauge 14 to the fluid pressure device 12 will be described. First, the user attaches the adapter 24 to the fluid pressure device 12 with the two bolts 86. In this case, if the adapter 24 is attached to the fluid pressure device 12 such that the first side surface 80a is oriented in the direction of gravity, there is a possibility that the retaining member 26 falls. In the present embodiment, since the four insertion holes 84 are provided at the respective corner portions of the adapter main body 79, the user can attach the adapter 24 to the fluid pressure device 12 such that the first side surface 80a is not oriented in the direction of gravity.

Thereafter, the attachment convex portion 69 is fitted into the attachment hole 88. Specifically, the attachment convex portion 69 and the attachment hole 88 have a fitting structure capable of changing the relative position between the attachment convex portion 69 and the adapter 24 in the circumferential direction about the axis Ax of the attachment convex portion 69. Specifically, the orientation of the display surface 37 in a state in which the attachment convex portion 69 is fitted into the attachment hole 88 can be changed at intervals of 45° in the circumferential direction about the axis Ax of the attachment convex portion 69.

Figure 9A:
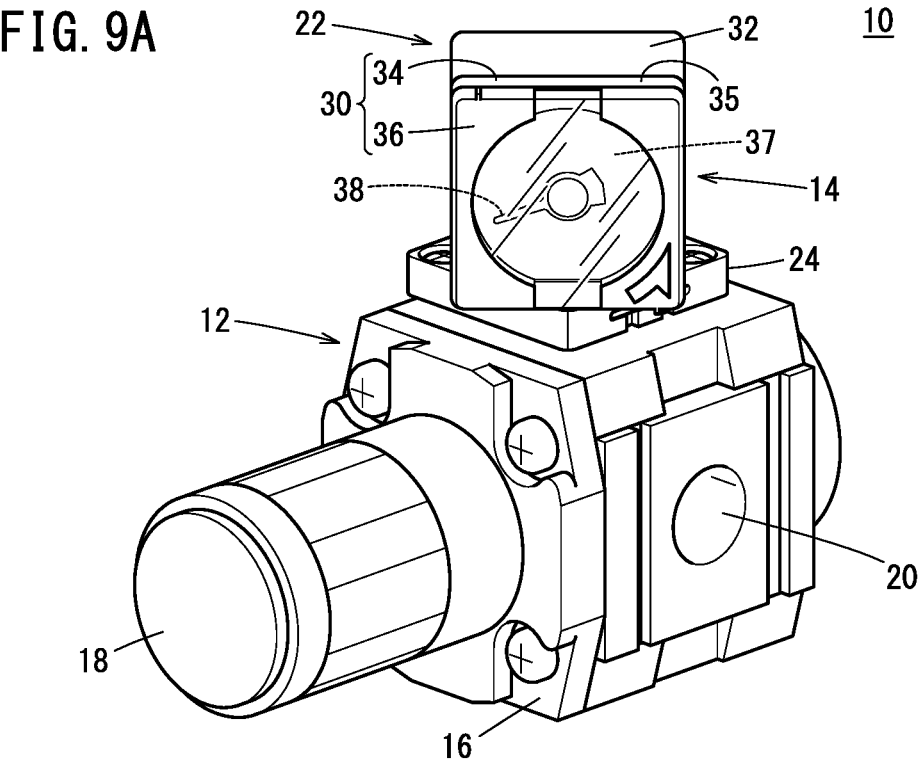
FIG. 9A is a perspective view of the fluid pressure system according to a first example in which the orientation of a display surface of the pressure gauge of FIG. 1 is changed.
Figure 9B:
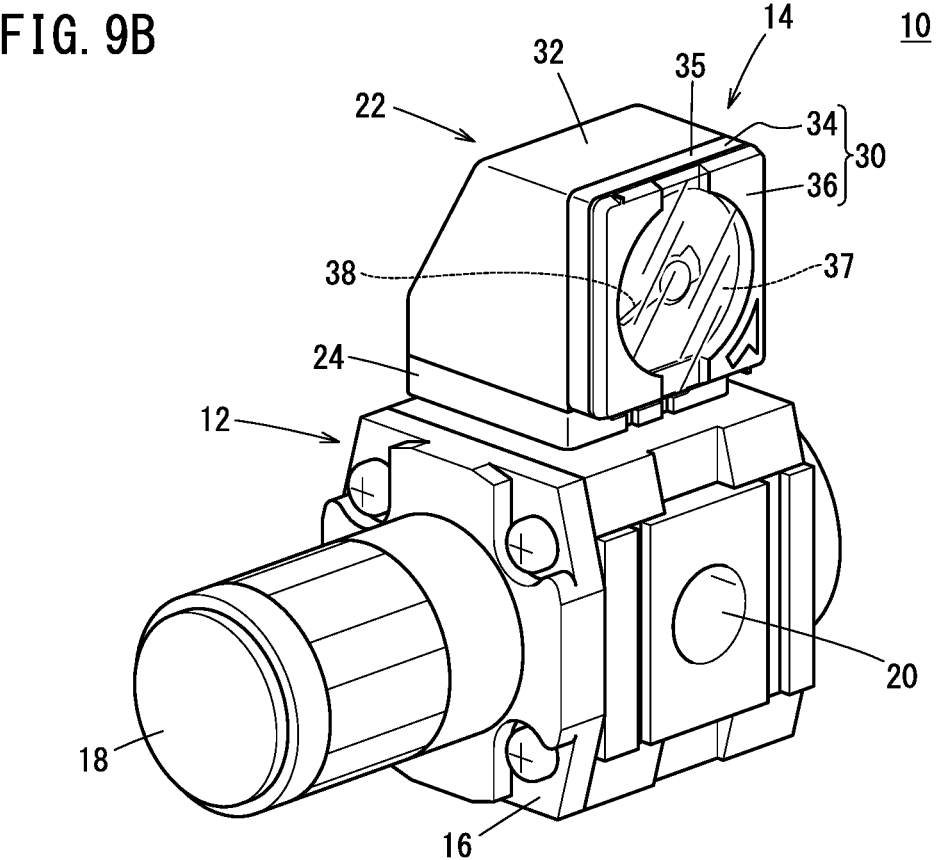
FIG. 9B is a perspective view of the fluid pressure system according to a second example in which the orientation of the display surface of the pressure gauge of FIG. 1 is changed.

That is, for example, as shown in FIG. 1, the attachment convex portion 69 can be fitted into the attachment hole 88 in a state where the display surface 37 is oriented in a direction in which the handle 18 protrudes from the valve main body 16. Further, for example, as shown in FIG. 9A, the attachment convex portion 69 can be fitted into the attachment hole 88 in a state where the display surface 37 is oriented in a direction inclined by 45° in the circumferential direction about the axis Ax of the attachment convex portion 69 with respect to the direction in which the handle 18 protrudes from the valve main body 16. Furthermore, for example, as shown in FIG. 9B, the attachment convex portion 69 can be fitted into the attachment hole 88 in a state where the display surface 37 is oriented in a direction inclined by 90° in the circumferential direction about the axis Ax of the attachment convex portion 69 with respect to the direction in which the handle 18 protrudes from the valve main body 16. That is, it is possible to easily change the orientation of the display surface 37 according to the user's usage.

After the attachment convex portion 69 is fitted into the attachment hole 88, the retaining member 26 is inserted into the insertion hole 102 of the adapter 24. Specifically, as shown in FIG. 8, the two locking portions 114 of the retaining member 26 are inserted into the annular groove 78 from the two first holes 104. Then, the distal end portion of each locking portion 114 is inserted into the second opening portion 112. In this case, since the area of the second opening portion 112 is larger than the cross-sectional area of the second hole 106, each locking portion 114 is smoothly inserted into the second opening portion 112. When the insertion of the retaining member 26 into the insertion hole 102 is completed, the attachment of the pressure gauge 14 to the fluid pressure device 12 is completed.

The pressure gauge 14 according to the present embodiment has the following effects.

According to the present embodiment, the display surface 37 is oriented in a direction intersecting the axis Ax of the attachment convex portion 69. Further, the attachment convex portion 69 and the attachment hole 88 have a fitting structure capable of changing the relative position between the attachment convex portion 69 and the adapter 24 in the circumferential direction about the axis Ax of the attachment convex portion 69. Therefore, the orientation of the display surface 37 can be easily changed. As a result, the display surface 37 can be oriented in a direction in which the display surface 37 is easily visible, according to the user's usage.

The adapter 24 includes the inner attachment surface 90 surrounding the attachment hole 88. The attachment convex portion 69 includes the polygonal outer attachment surface 76. The inner attachment surface 90 restricts rotation of the attachment convex portion 69 about the axis Ax relative to the adapter 24 in the fitted state in which the attachment convex portion 69 is fitted into the attachment hole 88.

According to such a configuration, it is possible to prevent the orientation of the display surface 37 from being changed when the user unintentionally touches the pressure gauge 14.

The inner attachment surface 90 is formed in a polygonal shape.

According to such a configuration, rotation of the attachment convex portion 69 relative to the adapter 24 in the fitted state can be restricted with a simple configuration.

The attachment convex portion 69 is 45° rotationally symmetric about the axis Ax of the attachment convex portion 69.

According to such a configuration, the orientation of the display surface 37 can be changed at intervals of 45° in the circumferential direction about the axis Ax of the attachment convex portion 69.

The outer attachment surface 76 is formed in an octagonal shape. The inner attachment surface 90 includes a plurality of flat surfaces facing the plurality of flat surfaces 77 of the outer attachment surface 76 in the fitted state.

According to such a configuration, the orientation of the display surface 37 can be changed at intervals of 45° in the circumferential direction about the axis Ax of the attachment convex portion 69 with a simple configuration.

The pressure gauge 14 includes the retaining member 26 having a line shape and used for preventing the attachment convex portion 69 from coming out of the attachment hole 88. The outer attachment surface 76 includes the annular groove 78 extending in the circumferential direction about the axis Ax of the attachment convex portion 69. The adapter 24 includes the insertion hole 102 communicating with the annular groove 78 in the fitted state. The retaining member 26 is inserted into the insertion hole 102 and the annular groove 78 so as to straddle the insertion hole 102 and the annular groove 78.

According to such a configuration, it is possible to prevent the attachment convex portion 69 from coming out of the attachment hole 88 with a simple configuration.

The adapter 24 includes the first holes 104 and the second holes 106. Each of the first holes 104 extends linearly from the first side surface 80a of the adapter 24 to the inner attachment surface 90. Each of the second holes 106 is located on an extension line of the first hole 104 and extends linearly from the inner attachment surface 90. The second hole 106 opens to the second connecting flat surface 100b of the inner attachment surface 90, the second connecting flat surface 100b extending in a direction inclined with respect to the extending direction of the second hole 106. The retaining member 26 is inserted into the first holes 104, the annular groove 78, and the second holes 106 so as to straddle the first holes 104, the annular groove 78, and the second holes 106.

According to such a configuration, the area of the second opening portion 112 that is a part of the second hole 106 and opens to the second connecting flat surface 100b can be made larger than the cross-sectional area of the second hole 106. As a result, after the retaining member 26 is passed through the annular groove 78 from the first holes 104, the distal end portions of the retaining member 26 can be smoothly inserted into the second opening portions 112. In addition, since the area of the second opening portion 112 can be increased without chamfering the edge portion of the second opening portion 112, the manufacturing cost of the adapter 24 can be suppressed.

Figure 10:
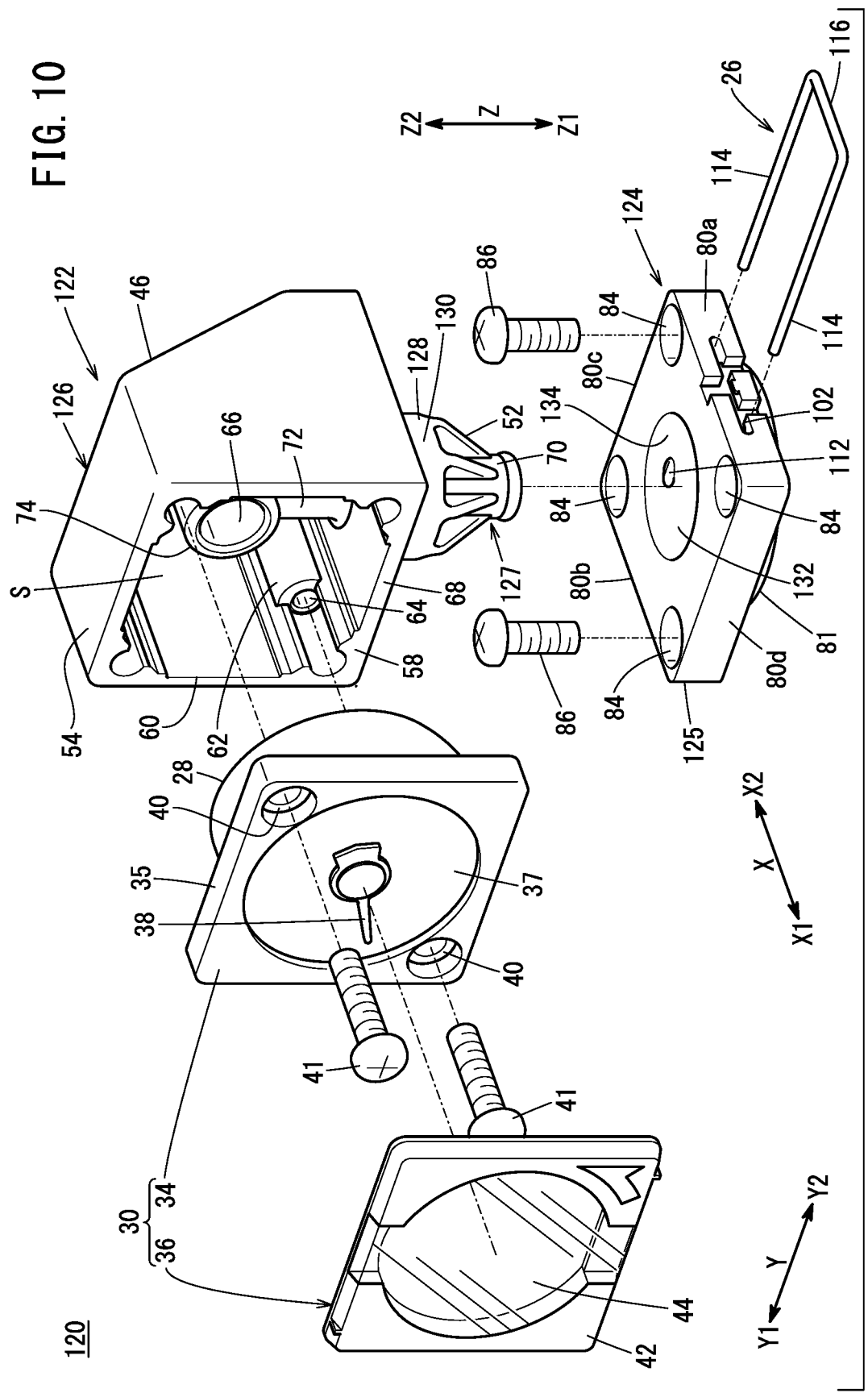
FIG. 10 is an exploded perspective view of a pressure gauge according to a modification.

The fluid pressure system 10 may include a pressure gauge 120 according to a modification shown in FIG. 10 instead of the pressure gauge 14 described above. In the modification, the same reference numerals as those of the above-described embodiment denote the same components. Further, in the modification, description of the same configuration as that of the above-described embodiment will be omitted.

Figure 11:
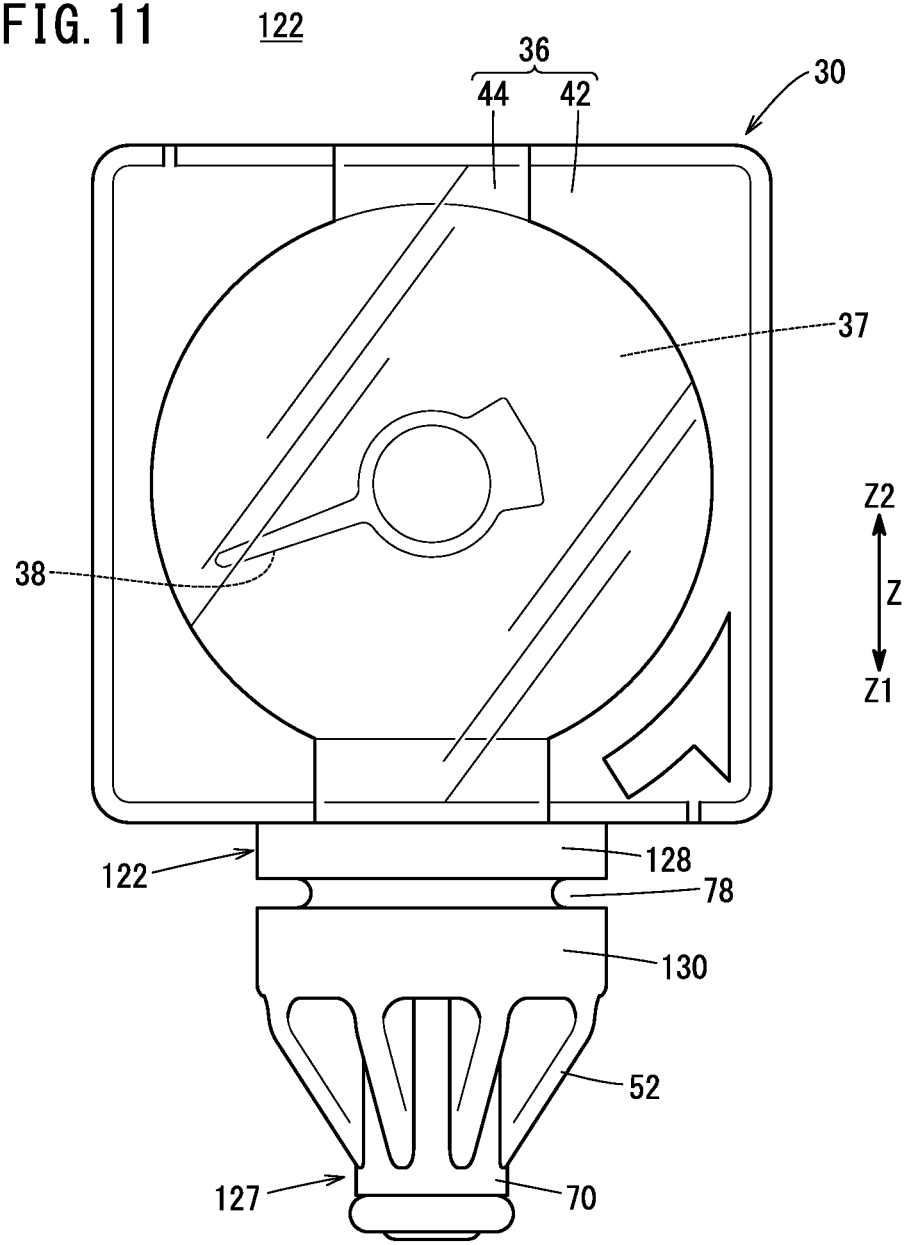
FIG. 11 is a front view of a pressure gauge main body of FIG. 10.
Figure 12:
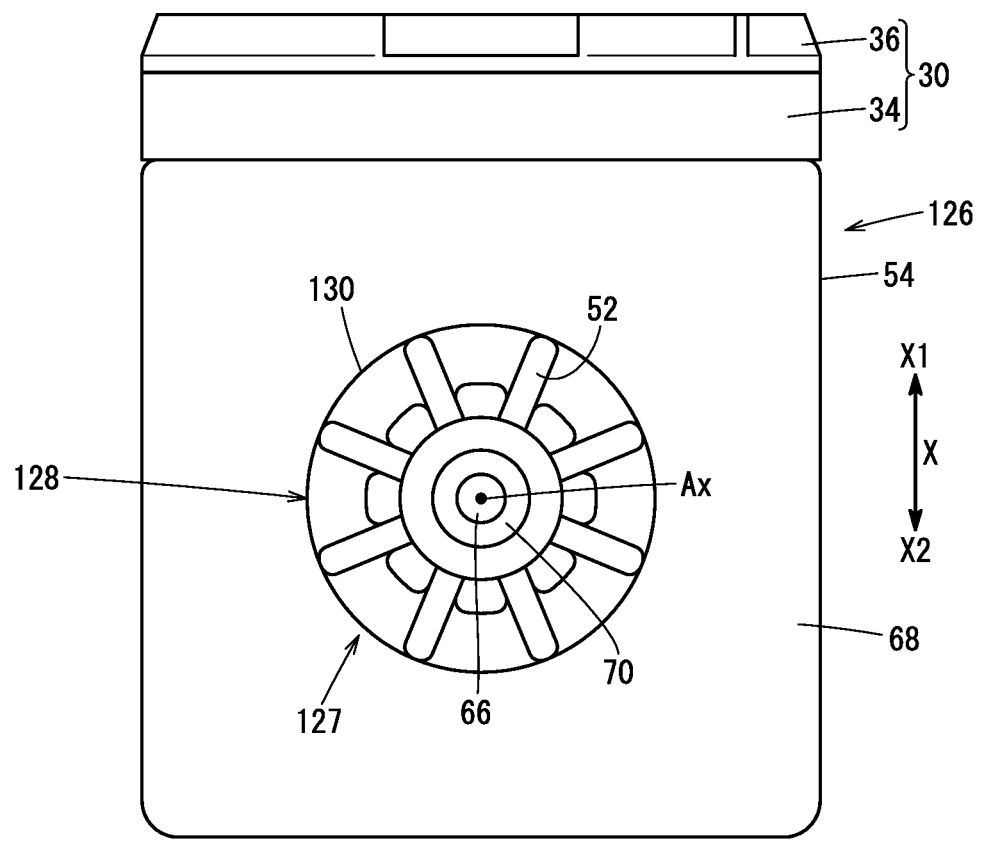
FIG. 12 is a bottom view of the pressure gauge main body of FIG. 10.

As shown in FIG. 10, the pressure gauge 120 includes a pressure gauge main body 122, an adapter 124, and the retaining member 26. The pressure gauge main body 122 includes the measurement unit 28, the display unit 30, and a case 126. As shown in FIGS. 10 to 12, a fluid introduction portion 127 of the case 126 includes an attachment convex portion 128. The attachment convex portion 128 includes an outer attachment surface 130 having a circular shape (perfect circular shape). The annular groove 78 is formed in the outer attachment surface 130.

Figure 13:
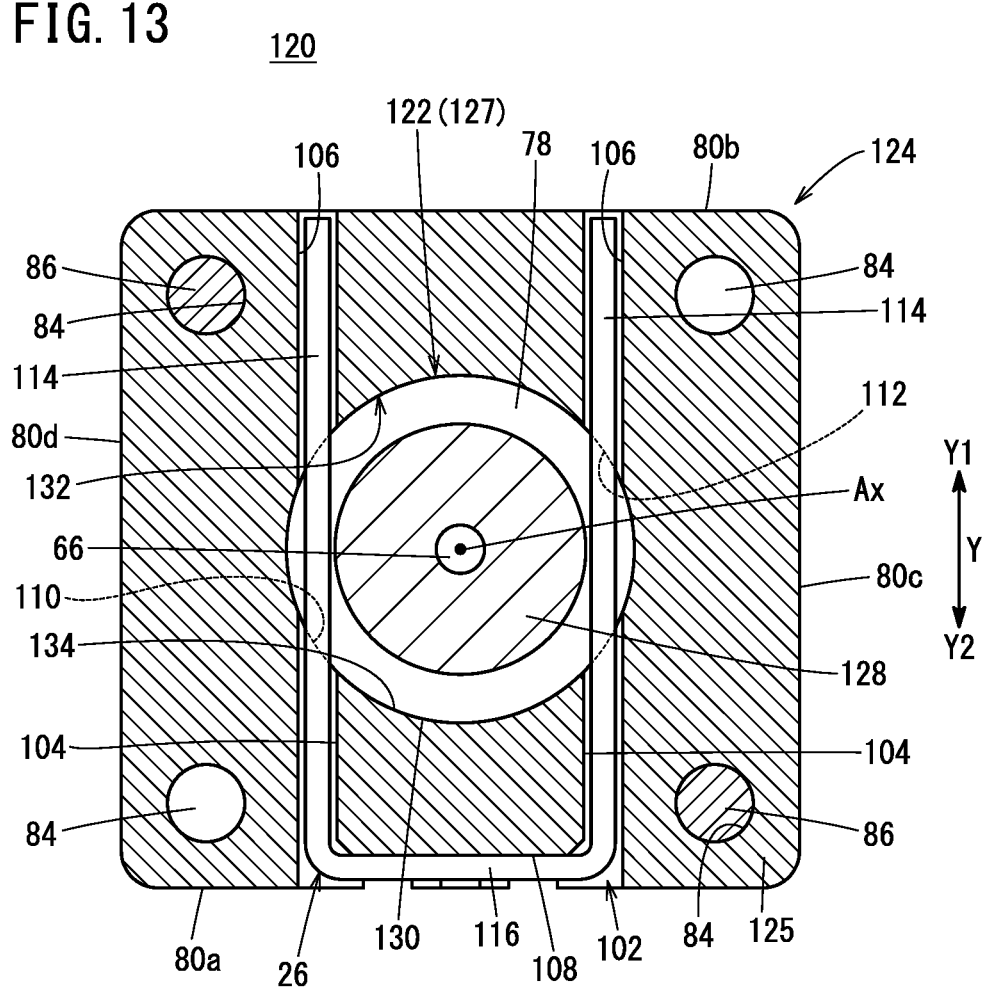
FIG. 13 is a transverse cross-sectional view of the pressure gauge of FIG. 10.

As shown in FIGS. 10 and 13, an adapter main body 125 of the adapter 124 is provided with an attachment hole 132 into which the attachment convex portion 128 can be fitted. The adapter 124 includes an inner attachment surface 134 surrounding the attachment hole 132. The inner attachment surface 134 is formed in a circular shape (perfect circular shape). The inner attachment surface 134 faces the outer attachment surface 130 in a fitted state in which the attachment convex portion 128 is fitted into the attachment hole 132. In the fitted state, the inner attachment surface 134 is close to or in contact with the outer attachment surface 130 such that the attachment convex portion 128 is rotatable about the axis Ax.

In the present modification, the adapter 124 includes the circular inner attachment surface 134 surrounding the attachment hole 132. The attachment convex portion 128 includes the circular outer attachment surface 130. The outer attachment surface 130 and the inner attachment surface 134 face each other in the fitted state in which the attachment convex portion 128 is fitted into the attachment hole 132.

According to such a configuration, the orientation of the display surface 37 can be continuously changed in the circumferential direction about the axis Ax of the attachment convex portion 128. Therefore, the display surface 37 can be oriented in a direction in which the display surface 37 is more easily visible, according to the user's usage.

The attachment convex portion 128 is rotatable about the axis Ax of the attachment convex portion 128 relative to the adapter 124 in the fitted state.

According to such a configuration, the orientation of the display surface 37 can be adjusted in the fitted state in which the attachment convex portion 128 is fitted into the attachment hole 132.

The present invention is not limited to the embodiment described above, and various configurations may be adopted therein without deviating from the essence and gist of the present invention.

The present embodiment discloses the following contents.

The above embodiment discloses the pressure gauge (14, 120) including: the case (32, 126) configured to accommodate the measurement unit (28) configured to measure the pressure of the fluid; the display unit (30) provided in the case and configured to display the pressure measured by the measurement unit; and the adapter (24, 124) attached to the fluid pressure device (12), wherein the adapter includes the attachment hole (88, 132), the case includes the attachment convex portion (69, 128) configured to be fitted into the attachment hole, the display unit includes the display surface (37) oriented in the direction intersecting the axis (Ax) of the attachment convex portion, and the attachment convex portion and the attachment hole have the fitting structure that allows the relative position between the attachment convex portion and the adapter in the circumferential direction about the axis of the attachment convex portion to be changed.

In the above-described pressure gauge, the adapter may include the inner attachment surface (90) configured to surround the attachment hole, the attachment convex portion may include the outer attachment surface (76) having a polygonal shape, and the inner attachment surface may restrict rotation of the attachment convex portion about the axis relative to the adapter in the fitted state in which the attachment convex portion is fitted into the attachment hole.

In the above-described pressure gauge, the inner attachment surface may be formed in a polygonal shape.

In the above-described pressure gauge, the attachment convex portion may be 45° rotationally symmetric about the axis of the attachment convex portion.

In the above-described pressure gauge, the outer attachment surface may be formed in an octagonal shape, and inner attachment surface may include the plurality of flat surfaces facing the plurality of flat surfaces (77) of the outer attachment surface in the fitted state.

In the above-described pressure gauge, the adapter may include the inner attachment surface (134) having a circular shape and configured to surround the attachment hole, the attachment convex portion may include the outer attachment surface (130) having a circular shape, and the inner attachment surface may face the outer attachment surface in the fitted state in which the attachment convex portion is fitted into the attachment hole.

In the above-described pressure gauge, the attachment convex portion may be rotatable about the axis of the attachment convex portion relative to the adapter in the fitted state.

In the above-described pressure gauge, the pressure gauge may include the retaining member (26) having a line shape and configured to prevent the attachment convex portion from coming out of the attachment hole, the outer attachment surface may include the annular groove (78) extending in the circumferential direction about the axis of the attachment convex portion, the adapter may include the insertion hole (102) communicating with the annular groove in the fitted state, and the retaining member may be inserted into the insertion hole and the annular groove so as to straddle the insertion hole and the annular groove.

In the above-described pressure gauge, the pressure gauge may include the retaining member having a line shape and configured to prevent the attachment convex portion from coming out of the attachment hole, the outer attachment surface may include the annular groove extending in the circumferential direction about the axis of the attachment convex portion, the adapter may include the first hole (104) extending linearly from the outer surface (80a) of the adapter to the inner attachment surface, and the second hole (106) located on the extension line of the first hole and extending linearly from the inner attachment surface, the second hole may open to the flat surface (100b) of the inner attachment surface, the flat surface extending in the direction inclined with respect to the extending direction of the second hole, and the retaining member may be inserted into the first hole, the annular groove, and the second hole so as to straddle the first hole, the annular groove, and the second hole.

The above embodiment discloses the fluid pressure system (10) including the fluid pressure device, and the pressure gauge attached to the fluid pressure device, wherein the pressure gauge is the above-described pressure gauge.

What is claimed is:

1. A pressure gauge comprising:
   a case configured to accommodate a measurement unit configured to measure a pressure of a fluid;
   a display unit provided in the case and configured to display the pressure measured by the measurement unit; and
   an adapter attached to a fluid pressure device, wherein
   the adapter includes an attachment hole,
   the case includes an attachment convex portion configured to be fitted into the attachment hole,
   the display unit includes a display surface oriented in a direction intersecting an axis of the attachment convex portion, and
   the attachment convex portion and the attachment hole have a fitting structure that allows a relative position between the attachment convex portion and the adapter in a circumferential direction about the axis of the attachment convex portion to be changed,
   wherein
   the adapter includes an inner attachment surface configured to surround the attachment hole,
   the attachment convex portion includes an outer attachment surface having a polygonal shape, and
   the inner attachment surface restricts rotation of the attachment convex portion about the axis relative to the adapter in a fitted state in which the attachment convex portion is fitted into the attachment hole.

2. The pressure gauge according to claim 1, wherein the inner attachment surface is formed in a polygonal shape.

3. The pressure gauge according to claim 2, wherein the attachment convex portion is 45° rotationally symmetric about the axis of the attachment convex portion.

4. The pressure gauge according to claim 3, wherein the outer attachment surface is formed in an octagonal shape, and
   the inner attachment surface includes a plurality of flat surfaces facing a plurality of flat surfaces of the outer attachment surface in the fitted state.

5. The pressure gauge according to claim 4, further comprising a retaining member having a line shape and configured to prevent the attachment convex portion from coming out of the attachment hole, wherein
   the outer attachment surface includes an annular groove extending in the circumferential direction about the axis of the attachment convex portion,
   the adapter includes:
   a first hole extending linearly from an outer surface of the adapter to the inner attachment surface; and
   a second hole located on an extension line of the first hole and extending linearly from the inner attachment surface,
   the second hole opens to a flat surface of the inner attachment surface, the flat surface extending in a direction inclined with respect to an extending direction of the second hole, and
   the retaining member is inserted into the first hole, the annular groove, and the second hole so as to straddle the first hole, the annular groove, and the second hole.

6. The pressure gauge according to claim 1, further comprising a retaining member having a line shape and configured to prevent the attachment convex portion from coming out of the attachment hole, wherein
   the outer attachment surface includes an annular groove extending in the circumferential direction about the axis of the attachment convex portion,
   the adapter includes an insertion hole communicating with the annular groove in the fitted state, and
   the retaining member is inserted into the insertion hole and the annular groove so as to straddle the insertion hole and the annular groove.

7. A fluid pressure system comprising:
   a fluid pressure device; and
   a pressure gauge attached to the fluid pressure device, wherein
   the pressure gauge includes:
   a case configured to accommodate a measurement unit configured to measure a pressure of a fluid;
   a display unit provided in the case and configured to display the pressure measured by the measurement unit; and
   an adapter attached to the fluid pressure device,
   the adapter includes an attachment hole,
   the case includes an attachment convex portion configured to be fitted into the attachment hole,
   the display unit includes a display surface oriented in a direction intersecting an axis of the attachment convex portion, and
   the attachment convex portion and the attachment hole have a fitting structure that allows a relative position between the attachment convex portion and the adapter in a circumferential direction about the axis of the attachment convex portion to be changed, wherein
the adapter includes an inner attachment surface configured to surround the attachment hole,
the attachment convex portion includes an outer attachment surface having a polygonal shape, and
the inner attachment surface restricts rotation of the attachment convex portion about the axis relative to the adapter in a fitted state in which the attachment convex portion is fitted into the attachment hole.

8. The fluid pressure system according to claim 7, wherein the inner attachment surface is formed in a polygonal shape.

9. The fluid pressure system according to claim 8, wherein the attachment convex portion is 45° rotationally symmetric about the axis of the attachment convex portion.

10. The fluid pressure system according to claim 9, wherein
the outer attachment surface is formed in an octagonal shape, and
the inner attachment surface includes a plurality of flat surfaces facing a plurality of flat surfaces of the outer attachment surface in the fitted state.

11. The fluid pressure system according to claim 10, wherein
the pressure gauge includes a retaining member having a line shape and configured to prevent the attachment convex portion from coming out of the attachment hole,
the outer attachment surface includes an annular groove extending in the circumferential direction about the axis of the attachment convex portion,
the adapter includes:
a first hole extending linearly from an outer surface of the adapter to the inner attachment surface; and
a second hole located on an extension line of the first hole and extending linearly from the inner attachment surface,
the second hole opens to a flat surface of the inner attachment surface, the flat surface extending in a direction inclined with respect to an extending direction of the second hole, and
the retaining member is inserted into the first hole, the annular groove, and the second hole so as to straddle the first hole, the annular groove, and the second hole.

12. The fluid pressure system according to claim 7, wherein
the pressure gauge includes a retaining member having a line shape and configured to prevent the attachment convex portion from coming out of the attachment hole,
the outer attachment surface includes an annular groove extending in the circumferential direction about the axis of the attachment convex portion,
the adapter includes an insertion hole communicating with the annular groove in the fitted state, and
the retaining member is inserted into the insertion hole and the annular groove so as to straddle the insertion hole and the annular groove.

\* \* \* \* \*